United States Patent [19]

Plummer et al.

[11] Patent Number: 4,561,753
[45] Date of Patent: Dec. 31, 1985

[54] SELECTIVE PHOTORESPONSIVE SENSING CIRCUIT

[75] Inventors: William T. Plummer, Concord, Mass.; Philip G. Baker, Cupertino, Calif.

[73] Assignee: Polaroid Corporation, Cambridge, Mass.

[21] Appl. No.: 711,176

[22] Filed: Mar. 13, 1985

[51] Int. Cl.$^4$ ............................ G03B 7/081; G01J 1/44
[52] U.S. Cl. ................................. 354/432; 250/214 P; 356/222
[58] Field of Search ................ 354/432; 356/222, 226; 250/209, 214 P

[56] References Cited

U.S. PATENT DOCUMENTS

| | | | |
|---|---|---|---|
| 3,232,191 | 2/1966 | Sherwood | 95/10 |
| 3,511,142 | 5/1970 | Biber | 95/10 |
| 3,545,350 | 12/1970 | Gross | 95/10 |
| 3,547,017 | 12/1970 | Harvey | 95/10 |
| 3,563,143 | 2/1971 | Petersen | 95/10 |
| 3,714,442 | 1/1973 | Frank | 250/209 |
| 3,717,077 | 2/1973 | Harvey | 95/10 CE |
| 3,724,343 | 4/1973 | Lancor, Jr. et al. | 95/10 R |
| 3,741,088 | 6/1973 | Nobusawa | 95/10 CT |
| 3,772,517 | 11/1973 | Smith | 250/209 |
| 3,884,584 | 5/1975 | Tsunekawa et al. | 356/226 |
| 3,889,276 | 6/1975 | Shirai | 354/31 |
| 3,945,732 | 3/1976 | Nobusawa | 356/222 |
| 3,971,046 | 7/1976 | Nobusawa | 354/24 |
| 3,994,595 | 11/1976 | Nobusawa | 356/222 |

Primary Examiner—William B. Perkey
Attorney, Agent, or Firm—Edward S. Roman

[57] ABSTRACT

A photosensor arrangement for providing an exposure influencing control signal in a photographic camera apparatus includes a photosensor array wherein the exposure influencing control signal comprises an average of the output signals from all the photosensors in the array excepting the output signals from those photosensors in the array which detect the highest and lowest scene light intensities.

19 Claims, 2 Drawing Figures

SELECTIVE PHOTORESPONSIVE SENSING CIRCUIT

BACKGROUND OF THE INVENTION

1. Field of the Invention

This invention relates generally to a selective photoresponsive sensing circuit and, more particularly, to a multi-photosensor arrangement for providing a select exposure influencing control signal in a photographic camera apparatus.

2. Description of the Prior Art

Various types of single cell and multicell photosensor arrangements for photographic cameras have been developed to measure the light reflected from a scene to be photographed and provide an exposure influencing control signal which may operate to control such exposure influencing events as the duration of the film exposure interval or the flash fire time and duration for a quench strobe. The simplest photosensors for cameras generally include a single photoresponsive cell that has a field of view approximately the same as that of the camera. Various types of multicell photometers have been developed in an effort to increase the accuracy of the film exposure interval determination over a wide range of differing scene illumination conditions. In some of these multicell photometers, the individual cells are arranged in an ordered array of rows and columns occupying an overall field of view equivalent to that of the camera. The output signals from the individual photosensors are utilized to determine an exposure interval in accordance with some selected algorithm. Difficulty may arise when one of the photocells senses either an inordinately bright spot occupying a relatively small area of the scene such as a small bright lamp in the foreground portion of an interior scene or the sun in an outdoor scene thereby providing an undue influence upon the determination of the exposure interval. Such a bright spot may result in the exposure interval being shorter than what would otherwise be required to provide a full exposure of the major portion of the scene excluding the bright spot. Conversely, a dark spot occupying a relatively small area of the scene such as may result from a small, highly non-reflective object in the scene can result in a longer exposure interval than would otherwise be necessary to adequately expose the major non-dark portion of the scene. Thus, multiple photosensor arrangements may be adversely effected from either bright or dark spots which occupy relatively small portions of the scene.

Therefore, it is a primary object of this invention to provide a multi-photosensor arrangement for a photographic camera which is not adversely effected from bright or dark spots which occupy a relatively small portion of the scene to be photographed.

It is a further object of this invention to provide a multi-photosensor arrangement for a photographic camera in which the output signal from the photosensor which detects the brightest scene light and the output sensor from the photosensor which detects the lowest scene light intensity are automatically discounted so as not to adversely effect the film exposure.

It is an even further object of this invention to provide a multi-photosensor arrangement for a photographic camera which provides an exposure influencing control signal based on an average of the intermediate values of the scene light intensity sensed by the individual photosensors regardless of the highest and lowest values of scene light intensity sensed by the photosensors.

Other objects of the invention will be in part obvious and will in part appear hereinafter. The invention accordingly comprises a circuit and system possessing the construction, combination of elements and arrangement of parts which are exemplified in the following detailed disclosure.

SUMMARY OF THE INVENTION

A photosensor arrangement is provided for use in a photographic camera apparatus for providing an exposure influencing control signal. The photosensor arrangement comprises a plurality of photoresponsive elements each arranged to have a different select field of view. A circuit connecting the photoresponsive elements provides an output signal for each photoresponsive element corresponding to the scene light intensity detected by that photoresponsive element from its select field of view. The output signals are thereafter transmitted for all the photoresponsive elements excepting the output signals for select photoresponsive elements that detect the highest and lowest scene light intensities. The circuit includes means for averaging the transmitted output signals to provide one exposure influencing control signal.

The circuit operates to resistively bias the photoresponsive elements and in this manner provide an output signal for each photoresponsive element corresponding to the scene light intensity detected by that photoresponsive element from its select field of view. The circuit also provides a first control signal corresponding to the lowest scene light intensity detected by the photoresponsive elements and a second control signal corresponding to the highest scene light intensity detected by the photoresponsive elements. The circuit includes a gate control which responds to the output signals for the photoresponsive elements and to the first and second control signals to transmit the output signals for all the photoresponsive elements excepting the output signals for the select photoresponsive elements that detect the highest and lowest scene light intensities.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENT

Figure 1:
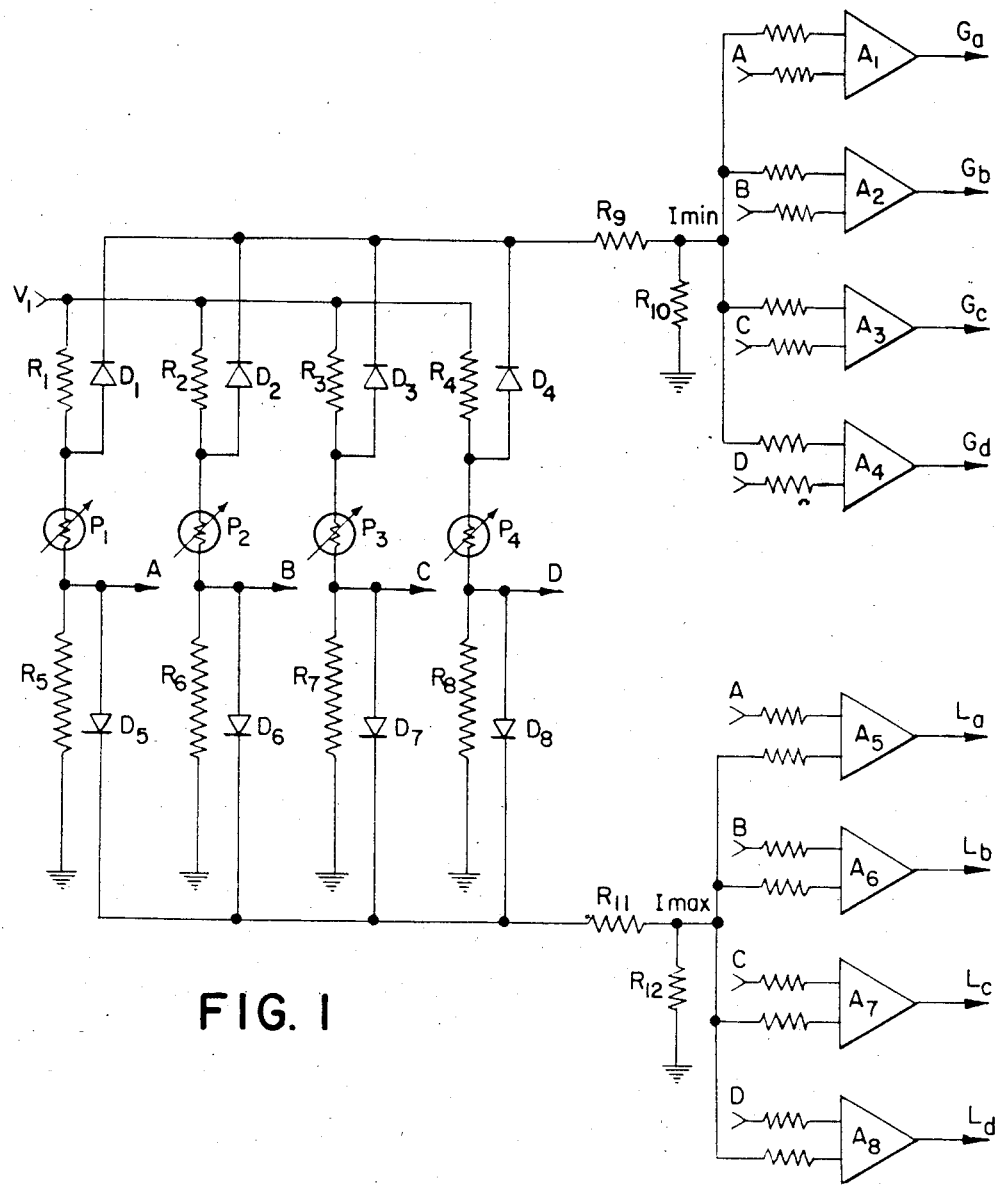
FIG. 1 is a schematic circuit diagram of a portion of the photosensor arrangement of this invention.
Figure 2:
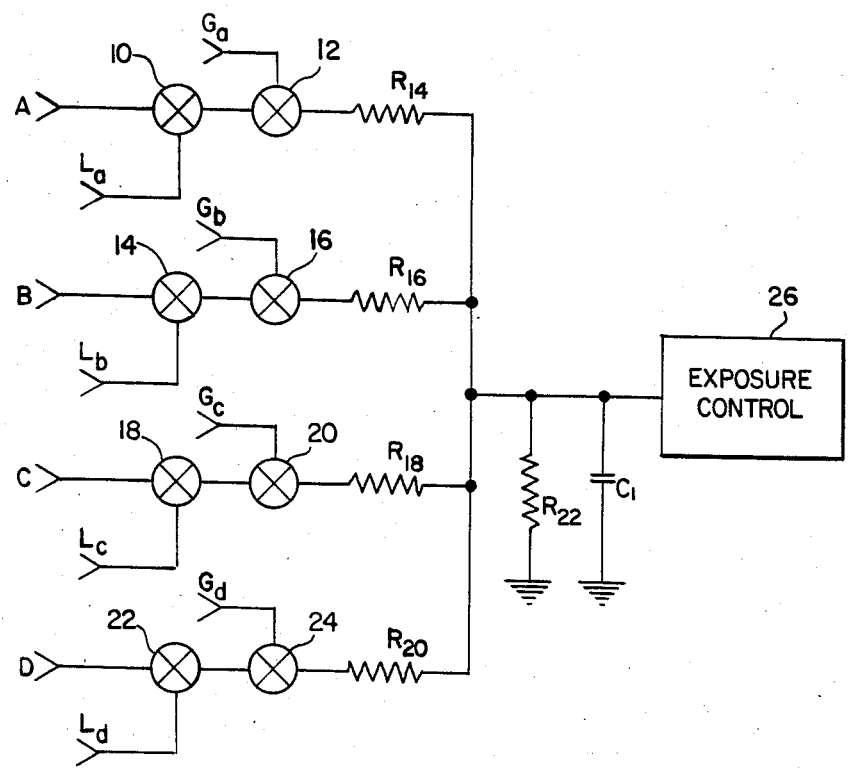
FIG. 2 is a schematic circuit diagram of the remaining portion of the photosensor arrangemnt of this invention.

Referring to FIG. 1, there is shown the multi-photosensor arrangement of this invention comprising a plurality of photoresponsive elements $P_1$ through $P_4$ each arranged to have a different select field of view. Although the field of view for each photoresponsive element $P_1$ through $P_4$ is different, it will be well understood that such fields of view need not be mutually exclusive and may in fact include overlapping areas of the scene to be photographed. Each of the photoresponsive elements $P_1$ through $P_4$ is preferably of the photoresistive type having positive terminals connected to a positive DC source $V_1$ by resistor elements $R_1$ through $R_4$, respectively, and negative terminals connected to ground by resistor elements $R_5$ through $R_8$, respectively. The positive terminals of the photoresponsive elements $P_1$ through $P_4$ connect, respectively, to the anode terminals of diodes $D_1$ through $D_4$, and the cathode terminals of the diodes $D_1$ through $D_4$ are in common connection with respect to each other. In like manner, the negative terminals of the photoresponsive elements $P_1$ through $P_4$ connect, respectively, to the anode terminals of diodes $D_5$ through $D_8$, and the cathode terminals of the diodes $D_5$ through $D_8$ are in common connection with respect to each other.

The cathodes of the diodes $D_1$ through $D_4$, in turn, connect by way of a resistor divider network comprising resistors $R_9$ and $R_{10}$ to the input terminals of a plurality of differential amplifiers or comparators $A_1$ through $A_4$. The other input terminals to the comparators $A_1$ through $A_4$ connect, respectively, to output terminals A through D from respective photoresponsive elements $P_1$ through $P_4$. The cathode terminals of the diodes $D_5$ through $D_8$, in turn, connect by way of a resistor divider network comprising resistors $R_{11}$ and $R_{12}$ to the input terminals of another plurality of comparators or differential amplifiers $A_5$ through $A_8$. The other input terminals to the comparators $A_5$ through $A_8$ connect, respectively, to the output terminals A through D from respective photoresponsive elements $P_1$ through $P_4$.

The output signals $G_a$ through $G_d$ from the respective comparators $A_1$ through $A_4$, in turn, connect respectively to control a plurality of gates as shown at 12, 16, 20 and 24. In like manner, the output signals $L_a$ through $L_d$ from the respective comparators $A_5$ through $A_8$ connect, respectively, to control a second plurality of gates as shown at 10, 14, 18 and 22. The output signals A through D from the respective photoresponsive elements $P_1$ through $P_4$ connect, respectively, to the input terminals of the gates 10, 14, 18 and 22. The output signals from the gates 12, 16, 20 and 24 connect, respectively, by way of resistors $R_{14}$, $R_{16}$, $R_{18}$ and $R_{20}$ to a common terminal grounded by way of a resistor $R_{22}$ and a capacitor $C_1$ in parallel connection with respect to each other. The output thereafter connects to a camera exposure control circuit of any well-known type as shown generally at 26.

Operation of the photosensor arrangement of this invention proceeds in the following manner. The photoresponsive elements $P_1$ through $P_4$ detect scene light from their respective fields of view and respond accordingly by providing a decreasing resistance in correspondence with the increasing intensity of the detected scene light. The photoresponsive element that detects the lowest scene light intensity which for purposes of illustration will be considered to be photoresponsive element $P_1$ also displays the highest resistance thereby forwardly biasing diode $D_1$ while the remaining diodes $D_2$ through $D_4$ remain reverse biased. Thus, there is provided a current flow through the diode $D_1$ and resistor $R_9$ corresponding to the minimum scene light intensity detected by all of the photoresponsive elements $P_1$ through $P_4$. Assuming for purposes of illustration that photoresponsive element $P_4$ detects the highest scene light intensity of all the photoresponsive elements, it will then display the lowest resistance so as to forwardly bias diode $D_8$, simultaneously reverse biasing the remaining diodes $D_5$ through $D_7$. Thus, there is provided a current flow by way of the diode $D_8$, resistor $R_{11}$ indicative of the maximum scene light intensity detected by the photoresponsive elements $P_1$ through $P_4$.

The current flow from the resistor $R_9$ indicative of the minimum scene light intensity detected by the photoresponsive elements $P_1$ through $P_4$ is directed to respective input terminals of the comparators $A_1$ through $A_4$ to establish a comparator reference voltage. The other input terminals to the comparators $A_1$ through $A_4$ connect, respectively, to the output terminals A, B, C, and D from the photoresponsive elements $P_1$ through $P_4$. As is now readily apparent, the output signals from the terminals B, C and D which correspond to the scene light intensity detected, respectively, by the photoresponsive elements $P_2$, $P_3$ and $P_4$ exceed the reference voltage to the comparators $A_2$, $A_3$ and $A_4$ established by the current flow from the forwardly biased diode $D_1$ and resistor $R_9$ so as to switch the outputs from the comparators $A_2$, $A_3$ and $A_4$ to provide affirmative gate enabling signals at terminals $G_b$, $G_c$ and $G_d$, respectively. Conversely, the output voltage from the terminal A corresponding to the lowest scene light intensity detected by the photoresponsive element $P_1$ will not exceed the reference voltage established by the current flow from the forwardly biased diode $D_1$ and resistor $R_9$ thereby not switching the comparator $A_1$ to provide the gate non-enabling signal.

In like manner, the current flow through the forwardly biased diode $D_8$ and resistor $R_{11}$ corresponding to the maximum scene light intensity detected by the photoresponsive elements $P_1$ through $P_4$ is directed to respective input terminals of comparators $A_5$ through $A_8$. The reference voltage inputs to the comparators $A_5$ through $A_8$ are established, respectively, by the output signals from the terminals A, B, C and D corresponding, respectively, to the scene light intensities detected by the photoresponsive elements $P_1$ through $P_4$. As is now readily apparent, the output signals from the terminals A, B and C which determine the reference voltage levels for the comparators $A_6$, $A_7$ and $A_8$, respectively, are exceeded by the input voltage levels as determined by the current flow from the forwardly biased diode $D_8$ and resistor $R_{11}$ corresponding to the maximum scene light intensity so detected. Thus, the comparators $A_6$, $A_7$ and $A_8$ switch to provide affirmative gate enabling signals at the output terminals $L_b$, $L_c$ and $L_d$, respectively. The output signal level from the terminal D corresponding to the highest scene light intensity so detected, however, does not exceed the signal level at the other input terminal to the comparator $A_8$ as determined by the current flow from the forwardly biased diode $D_8$ and resistor $R_{11}$ thereby resulting in the comparator $A_8$ providing a non-enabling gate control signal.

As previously discussed, the gate control signals $G_a$, $G_b$, $G_c$ and $G_d$ are directed, respectively, to gate circuits 12, 16, 20 and 24. Thus, the non-enabling gate control signal of the comparator $A_1$ at terminal $G_a$ operates to disable the gate 12 from transmitting a signal therethrough while the gates 16, 20 and 24 are enabled to transmit a signal therethrough by the control signals from the terminals $G_b$, $G_c$ and $G_d$, respectively. In like manner, the output control signals from the terminals $L_a$, $L_b$, $L_c$ and $L_d$ are directed, respectively, to the gate circuits 10, 14, 18 and 22. Thus, the non-enabling gate control output signal from the terminal $L_d$ of the comparator $A_8$ operates to disable the gate 22 from transmitting the input signal therethrough while the gates 10, 14 and 18 are enabled, respectively, by the gate enabling control signals from the terminals $L_a$, $L_b$ and $L_c$, respectively.

Thus, the output signal from the terminal A corresponding to the scene light intensity detected by the photoresponsive element $P_1$ is transmitted through the gate 10 by virtue of the gate enabling signal provided from the terminal $L_a$ and subsequently inhibited from transmission by the gate 12 by virtue of its non-enabling gate control signal received from the output terminal $G_a$. The output signal from the terminal B corresponding to the scene light intensity detected by the photoresponsive element $P_2$ is transmitted by the gate 14 by virtue of its enabling gate control signal received from the terminal $L_a$ and thereafter transmitted by the gate 16 by virtue of its enabling gate control signal received from the terminal $G_b$. The output signal from the terminal C corresponding to the scene light intensity detected by the photoresponsive element $P_3$, in turn, is transmitted by the gate 18 by virtue of its enabling gate control signal received from the terminal $L_c$ and thereafter transmitted by the gate 20 by virtue of its enabling gate control signal received from the output terminal $G_c$. The output signal from the terminal D corresponding to the scene light intensity detected by the photoresponsive element $P_4$ is inhibited from transmission by the gate 22 by virtue of its gate non-enabling signal received from the output terminal $L_d$. In this manner, the output signal from the terminal A corresponding to the lowest scene light intensity which as previously discussed was detected by the photoresponsive element $P_1$ is inhibited by the gate 12 from transmission to the exposure control 26 by virtue of the non-enabling gate control signal received from the output terminal $G_a$. In like manner, the output signal from the terminal D corresponding to the highest scene light intensity detected by the photoresponsive element $P_4$ is also inhibited by the gate 22 from transmission to the exposure control 26 by virtue of the non-enabling gate control signal received from the output terminal $L_d$. The remaining output signals from the terminals B and C corresponding to the intermediate scene light intensity values detected between the highest and lowest scene light intensities are transmitted by the gates 14, 16 and 18, 20, respectively, for combining at the common terminal between the resistors $R_{14}$, $R_{16}$, $R_{18}$ and $R_{20}$ into a single signal indicative of the average value of the intermediate scene light intensities. This signal indicative of the average intermediate scene light intensities, in turn, is transmitted to the exposure control 26 and thus utilized to control an exposure influencing event in any well-known manner.

Such exposure influencing events, as previously discussed, may include the timing of the exposure interval to close a shutter blade mechanism, the timing of the firing of a flash or a flash quench signal, or the preexposure detection of ambient scene light to determine whether the camera should be operated in a high or low ambient scene light mode. Thus, in this manner the undue influence of inordinately high intensity localized ambient scene light as may result from a bright source of light occupying a relatively small area of the scene such as a small but bright lamp in the foreground portion of an interior scene or the sun in an exterior scene can be minimized since the output signal from that photoresponsive element which detects the bright spot of light is inhibited. Conversely, the effects from an inordinately low intensity portion of the scene which may be attributable to a dark shadow or a highly non-reflective small spot in the scene may be minimized by inhibiting the transmission of the output signal from that photoresponsive element which detects the dark spot. Therefore, an averaged output signal is provided which more typically represents the overall scene light intensity regardless of local bright or dark spots in the scene light that could unduly influence the overall exposure.

It will be readily understood that although four photoresponsive elements have been shown and described, the invention is by no means so limited and more or less photoresponsive elements may be utilized. For small numbers of photoresponsive elements, however, such as the four elements shown, it is preferred that additional means as are well known in the art be provided to properly scale the average exposure influencing control signal. In addition, conventional means may be provided to insure that at least one output signal from the terminals A, B, C and D is gated through. Such means may include a latching circuit that counts the number of non-enabling gate control signals to insure that at least two gate enabling signals are provided to two serially connected gates. In addition, instead of inhibiting the transmission from the photoresponsive elements that detect the highest and lowest intensity of scene light it would also be well within the scope of the invention to inhibit the transmission of signals from those photoresponsive elements that detect scene light above a selected level and below a selected level. Toward this end, the trigger levels on the comparators $A_1$ through $A_8$ could be adjusted in a well-known manner to determine selected ranges within which the scene light must be detected in order to qualify for transmission to the exposure control. In addition, it would also be apparent that the transmission of signals from the photoresponsive elements which detect the highest scene light intensities can be inhibited without inhibiting the transmission of signals from the photoresponsive elements which detect the lowest scene light intensities. Conversely, it would be equally apparent that the transmission of signals from the photoresponsive elements which detect the lowest scene light intensities can also be inhibited without inhibiting the transmission of signals from the photoresponsive elements which detect the highest scene light intensities.

Other embodiments of the invention, including additions, subtractions, deletions and other modifications of the preferred disclosed embodiments of the invention will be obvious to those skilled in the art and are within the scope of the following claims.

What is claimed is:

1. A photosensor arrangement for providing an exposure influencing control signal in a photographic apparatus comprises:
    a plurality of photoresponsive elements each arranged to have a different select field of view; and
    circuit means for providing an output signal for each photoresponsive element corresponding to the scene light intensity detected by that photoresponsive element from its said select field of view and transmitting said output signals for all of said photoresponsive elements excepting the output signals for select photoresponsive elements that detect either the highest or lowest scene light intensities.

2. The photosensor arrangement of claim 1 including means for averaging said transmitted signals to provide one exposure influencing control signal.

3. A photosensor arrangement for providing an exposure influencing control signal in a photographic apparatus comprises:
   a plurality of photoresponsive elements each arranged to have a different select field of view;
   circuit means for biasing said photoresponsive elements and providing: an output signal for each photoresponsive element corresponding to the scene light intensity detected by that photoresponsive element from its said select field of view, and a control signal corresponding to the highest scene light intensity detected by said photoresponsive elements; and
   gate control means responsive to said output signals and said control signal for transmitting said output signals for all of said photoresponsive elements excepting the output signal for the photoresponsive element that detects said highest scene light intensity.

4. The photosensor arrangement of claim 3 including means for averaging said transmitted signals to provide one exposure influencing control signal.

5. The photosensor arrangement of claim 4 wherein said circuit means comprises means for resistively biasing each of said photoresponsive elements such that each photoresponsive element comprises a terminal that is positively biased and a terminal that is negatively biased, a plurality of diode elements having anode terminals connected, respectively, to the negatively biased terminals of said photoresponsive elements and cathode terminals in common connection with respect to each other, and means for resistively connecting said common cathode terminals of said diode elements to ground and for providing said control signal from said common cathode connection of said diode elements.

6. The photosensor arrangement of claim 4 wherein said gate control means comprises a plurality of comparators each of which includes one input terminal connected to receive said control signal and another input terminal connected to receive one of said output signals corresponding to the scene light detected by one of said photoresponsive elements, said comparators providing gate enabling signals corresponding, respectively, to all of said photoresponsive elements which detect scene light intensities less than the highest detected scene light intensity.

7. The photosensor arrangement of claim 4 wherein said gate control means comprises a plurality of gate elements arranged to transmit said output signal for each photoresponsive element in response to receipt of said gate enabling signals.

8. A photosensor arrangement for providing an exposure influencing control signal in a photographic apparatus comprises:
   a plurality of photoresponsive elements each arranged to have a different select field of view;
   circuit means for biasing said photoresponsive elements and providing: an output signal for each photoresponsive element corresponding to the scene light intensity detected by that photoresponsive element from its said select field of view, and a control signal corresponding to the lowest scene light intensity detected by said photoresponsive elements; and
   gate control means responsive to said output signals and said control signal for transmitting said output signals for all of said photoresponsive elements excepting the output signal for the photoresponsive element that detects said lowest scene light intensity.

9. The photosensor arrangement of claim 8 including means for averaging said transmitted signals to provide one exposure influencing control signal.

10. The photosensor arrangement of claim 9 wherein said circuit means comprises means for resistively biasing each of said photoresponsive elements such that each photoresponsive element comprises a terminal that is positively biased and a terminal that is negatively biased, a plurality of diode elements having anode terminals connected, respectively, to the positively biased terminals of said photoresponsive elements and cathode terminals in common connection with respect to each other, and means for resistively connecting said common cathode terminals of said diode elements to ground and for providing said control signal from said common cathode connection of said diode elements.

11. The photosensor arrangement of claim 9 wherein said gate control means comprises a plurality of comparators each of which includes one input terminal connected to receive said control signal and another input terminal connected to receive one of said output signals corresponding to the scene light detected by one of said photoresponsive elements, said comparators providing gate enabling signals corresponding, respectively, to all of said photoresponsive elements which detect scene light intensities greater than the lowest detected scene light intensity.

12. The photosensor arrangement of claim 9 wherein said gate control means comprises a plurality of gate elements arranged to transmit said output signal for each photoresponsive element in response to receipt of said gate enabling signals.

13. A photosensor arrangement for providing an exposure influencing control signal in a photographic apparatus comprises:
   a plurality of photoresponsive elements each arranged to have a different select field of view; and
   circuit means for providing an output signal for each photoresponsive element corresponding to the scene light intensity detected by that photoresponsive element from its said select field of view and transmitting said output signals for all of said photoresponsive elements excepting the output signals for select photoresponsive elements that detect the highest and lowest scene light intensities.

14. The photosensor arrangement of claim 13 including means for averaging said transmitted signals to provide one exposure influencing control signal.

15. A photosensor arrangement for providing an exposure influencing control signal in a photographic apparatus comprises:
   a plurality of photoresponsive elements each arranged to have a different select field of view;
   circuit means for biasing said photoresponsive elements and providing: an output signal for each photoresponsive element corresponding to the scene light intensity detected by that photoresponsive element from its said select field of view, a first control signal corresponding to the lowest scene light intensity detected by said photoresponsive elements and a second control signal corresponding to the highest scene light intensity detected by said photoresponsive elements; and gate control means responsive to said output signals and said first and second control signals for transmitting said output signals for all of said photoresponsive elements excepting the output signals for select photoresponsive elements that detect the highest and lowest scene light intensities.

16. The photosensor arrangement of claim 15 including means for averaging said transmitted signals to provide one exposure influencing control signal.

17. The photosensor arrangement of claim 16 wherein said circuit means comprises means for resistively biasing each of said photoresponsive elements such that each photoresponsive element comprises a terminal that is positively biased and a terminal that is negatively biased, a first plurality of diode elements having anode terminals connected, respectively, to the positively biased terminals of said photoresponsive elements and cathode terminals in common connection with respect to each other, means for resistively connecting said common cathode terminals of said first diode elements to ground and for providing said first control signal from said common cathode connection of said first diode elements, a second plurality of diode elements having anode terminals connected, respectively, to the negatively biased terminals of said photoresponsive elements and cathode terminals in common connection with respect to each other, and means for resistively connecting said common cathode terminals of said second diode elements to ground and for providing said second control signal from said common cathode connection of said second diode elements.

18. The photosensor arrangement of claim 16 wherein said gate control means comprises a first plurality of comparators each of which includes one input terminal connected to receive said first control signal and another input terminal connected to receive one of said output signals corresponding to the scene light detected by one of said photoresponsive elements, said first comparators providing first gate enabling signals corresponding, respectively, to all of said photoresponsive elements which detect scene light intensities greater than the lowest detected scene light intensity and a second plurality of comparators each of which includes one input terminal connected to receive said second control signal and another input terminal connected to receive one of said output signals corresponding to the scene light detected by one of said photoresponsive elements, said second comparators providing second gate enabling signals corresponding, respectively, to all of said photoresponsive elements which detect scene light intensities less than the highest detected scene light intensity.

19. The photosensor arrangement of claim 16 wherein said gate control means comprises a plurality of gate elements arranged to transmit said output signal for each photoresponsive element in response to receipt of said first and second gate enabling signals.

* * * * *